(12) United States Patent
Huret

(10) Patent No.: US 6,779,807 B2
(45) Date of Patent: Aug. 24, 2004

(54) HUMAN POWERED VEHICLE AND PROPELLING MECHANISM THEREOF

(76) Inventor: Bernard Huret, 46, avenue Bellevue, Saint Jean Cap Ferrat F-06230 (FR)

( * ) Notice: Subject to any disclaimer, the term of this patent is extended or adjusted under 35 U.S.C. 154(b) by 0 days.

(21) Appl. No.: 10/017,482

(22) Filed: Dec. 18, 2001

(65) Prior Publication Data

US 2002/0074768 A1 Jun. 20, 2002

Related U.S. Application Data

(63) Continuation-in-part of application No. PCT/FR99/01477, filed on Jun. 18, 1999.

(51) Int. Cl.[7] ............................. B62M 3/06; B62M 1/04
(52) U.S. Cl. ....................................... 280/257; 280/252
(58) Field of Search ................................ 280/210, 252, 280/253, 255–257

(56) References Cited

U.S. PATENT DOCUMENTS 5,161,430 A * 11/1992 Febey ....................... 74/594.7

FOREIGN PATENT DOCUMENTS

| BE | 871.551 | 4/1979 |
|---|---|---|
| DE | 34 04 562 A1 | 8/1985 |
| FR | 908.137 | 4/1946 |
| FR | 2 726 532 A1 | 5/1996 |

* cited by examiner

Primary Examiner—Lesley D. Morris
Assistant Examiner—Matthew Luby
(74) Attorney, Agent, or Firm—Foley & Lardner

(57) ABSTRACT

A human propelled vehicle, e.g., bicycle, has a propelling mechanism that allows crank arms longer than eight inches. The propelling mechanism includes first and second shafts coupled to first and second crank arms and trained to a gear train, which is trained to a conversion mechanism, which is trained to an output shaft. The crank arms extend rearwardly from their shafts so that the axes of the pedals mounted to the crank arms reciprocate in opposite directions through an arc that passes behind the bottom bracket axle.

69 Claims, 16 Drawing Sheets

HUMAN POWERED VEHICLE AND PROPELLING MECHANISM THEREOF

This is a continuation-in-part of International Application PCT/FR99/01477, which has an international filing date of Jun. 18, 1999; this international application was not published in English, but in French.

BACKGROUND

Human powered vehicles, such as bicycles, typically rely on a crank set having a pair of crank arms that fully revolve 360°. Thus, for optimal performance, the crank-arm length has to be formulated based on the human propelling engine, i.e., legs or arms. In this respect, after much studies and debate, for leg-powered cranks, the crank-arm length has been typically formulated to less than eight inches. Indeed, commercial bicycle crank arms sold have an effective length of 165 to 180 mm, in increments of 5 mm.

The revolving crank design, however, is not believed to be the optimal way of propelling human powered vehicles. Accordingly, this inspired various proposed crank designs, including an oscillation type using longer crank arms. None have yet made through commercially.

There remains a need for alternative ways of propelling human powered vehicles. The present invention addresses this need.

SUMMARY

The present invention relates to a human powered vehicle and a propelling mechanism thereof, which uses an oscillating crank type.

One aspect of the present invention is a human propelled vehicle, which can be, for instance, a bicycle. The vehicle can have a frame, at least one front wheel attached to the frame, at least one back wheel attached to the frame, a power transmission mounted to the frame for driving at least one of the wheels, and a propelling mechanism attached to the frame or have a mounting structure, such as a housing, that is integrally formed with the frame.

Another aspect of the present invention is the propelling mechanism for the vehicle mentioned above. The propelling mechanism can include a gearbox housing, first and second input shafts, first and second crank arms, a gear train, a conversion mechanism, and an output shaft. The first and second input shafts, and the output shaft can be rotatably journaled or mounted to the housing. The first crank arm can be secured to the first input shaft from one side of the housing and the second crank arm can be secured to the second input shaft from the opposite side of the housing.

Each of the first and second crank arms can have a length greater than eight inches. In this respect, an effective length of each crank arm can be between 8–14 inches. Also, the crank arm can be adjustable in length so that its effective length is adjustable between this range. The first and second crank arms can extend rearwardly from the respective first and second shafts so that the first and second crank arms can reciprocate in the opposite directions through an arc that passes behind the bottom bracket axle or the bottom bracket 13.

The gear train can include first and second gears mounted on the first input shaft, third and fourth gears mounted on the second input shaft. The first gear can engage the third gear so that the first and second crank arms can pivot in opposite directions. The conversion mechanism can be trained or coupled with the second and fourth gears for converting the reciprocating pivoting movements of the second and fourth gears driven by the first and second crank arms into a unidirectional rotation. The output shaft can be trained or coupled with the conversion mechanism and coupled to the power transmission for driving the one wheel, which can be either the front or the rear wheel.

In one embodiment, the frame can be a bicycle frame having a bottom bracket. The power transmission can include an axle rotatably journaled to the bottom bracket. The gearbox housing can be mounted to the frame so that it is located in front of the bottom bracket. The bicycle frame can further have a head tube and a down tube interconnecting the head tube and the bottom bracket. The gearbox housing can be removably attached or mounted to the down tube so that the entire housing is located in front of the bottom bracket.

The power transmission can include a drive sprocket secured to the output shaft on one outer side of the gearbox housing, a first driven sprocket secured to the bottom bracket axle on the same side of the gearbox housing as the drive sprocket, and a first chain training or coupling the drive sprocket and the driven sprocket. The power transmission can further include at least one second driven sprocket secured to the bottom bracket axle on the opposite side of the first driven sprocket, at least one wheel sprocket mounted to the one wheel, and a second chain training or coupling the second driven sprocket and the wheel sprocket.

The first and second input shafts and the bottom bracket axle all can be mounted parallel to the housing, but the first and second input shafts can be offset one above the other so that the distance between the first input shaft and the bottom bracket axle or the bottom bracket is the same as the distance between the second input shaft and the bottom bracket axle or the bottom bracket.

The conversion mechanism can include a third shaft rotatably journaled to the gearbox housing, and first and second free-wheeled gears mounted on the third shaft. The first and second freewheeled gears can respectively engage the second and fourth gears so that they can rotate the third shaft in one direction, but allow them to freely rotate in the opposite direction without rotating the third shaft in the same direction. The conversion mechanism can further include a fifth gear mounted on the third shaft, a fourth shaft rotatably journaled to the housing, sixth and seventh gears mounted on the fourth shaft, and an eighth gear mounted to the output shaft. The fifth gear can engage the sixth gear to drive the fourth shaft, and the seventh gear can engage the eighth gear to drive the output shaft. In another embodiment, the sixth gear can be omitted. Instead, the fourth shaft only has an intermediary or seventh gear, which can engage the output or eighth gear on the output shaft.

The first and second gears can be integrally united together or formed together and the third and fourth gears can be united together or formed together. The first and third gears can be positioned between the second and fourth gears. One of the fifth, sixth, seventh (intermediary), and eighth (output) gears can be freewheeled so that the output shaft does not back drive either the third or fourth shaft when the output shaft is rotated in reverse to the propelling direction. In one embodiment, the seventh gear is freewheeled so that the output shaft does not back drive the fourth shaft.

The propelling mechanism can further include means for mounting at least one of the first and second crank arms offset from the respective shaft. The propelling mechanism can further include an angular adjustment mechanism for angularly adjusting at least one of the first and second crank arms relative to the respective first or second shaft. The angular adjustment mechanism can include a first disk secured to one of the first and second input shafts. The angular adjustment mechanism can further include a second disk secured to the other of the first and second input shafts for a greater adjustment capability. The first and second disks can be secured respectively to the first and second input shafts. The first and second crank arms can be adjustably secured respectively to the first and second disks. The first and second disks can each have a plurality of positioning holes. The first and second crank arms can be mounted to the respective disks through at least a pair of diametrically opposing positioning holes.

Each of the first and second disks can have inner and outer concentric circular arrays of positioning holes, and each of the first and second crank arms can have two pairs of holes, one pair for mounting to the inner circular array of positioning holes and the other pair for mounting to the outer circular array of positioning holes.

The number of positioning holes in each of the first and second disks, for example, can be 36 or 40. For 36 and 40 hole disks, each circular array of positioning holes can have 18 or 20 position holes, which can be equally spaced. The positioning holes of the inner circular array can be circumferentially staggered relative to the positioning holes of the outer circular array. The positioning holes of each of the inner and outer circular arrays can be spaced at 20° and 18° intervals, and the spacing between adjacent holes of the staggered positioning holes can be spaced at 10° and 9° intervals for the 36 and 40 hole disks, respectively.

Each of the first and second disks also can have a hexagonal hole, and the respective first or second input shaft can have a hexagonal end that mates with the hexagonal hole. The hexagonal hole allows a quick 60° shift interval of the respective disk relative to the respective shaft.

The propelling mechanism can further include a stop for limiting the pivoting movement of each crank arm. The bicycle frame can further include a seat tube extending from the bottom bracket, at which the stop can be mounted. The stop also can be mounted to the gearbox housing or underneath the same.

The propelling mechanism or the gearbox housing further includes an anti-theft ring for attaching an anti-theft device. The gearbox housing can be mounted to the down tube with at least two U-bolt.

BRIEF DESCRIPTION OF THE DRAWINGS

These and other features, aspects, and advantages of the present invention will become more apparent from the following description, appended claims, and accompanying exemplary embodiments shown in the drawings, which are briefly described below.

FIG. 13A illustrates the inner side of the right-side part of the housing; FIG. 13B illustrates the central part of the housing and the position of the gears; FIG. 13C illustrates the inner side of the left-side part of the housing (mirror image of FIG. 13A); FIG. 13D illustrates a cross-sectional view of the left-side part of the housing (the right-side part thereof being a mirror image thereof).

DETAILED DESCRIPTION

Figure 1:
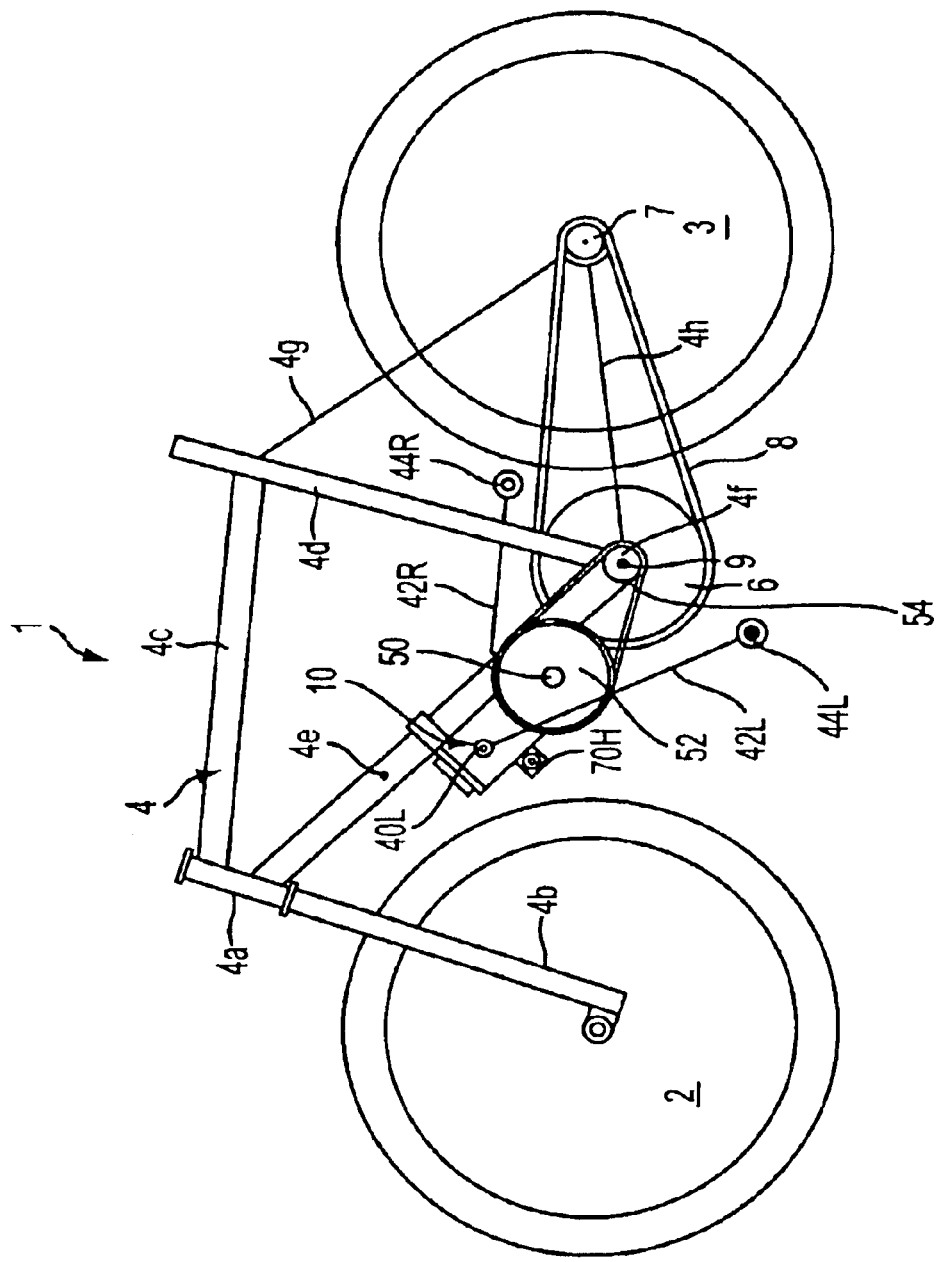
FIG. 1 schematically illustrates a left-side view of a human powered vehicle, e.g., bicycle, according to the present invention.

The drawings illustrate multiple exemplary embodiments to explain the present invention. In this regard, same or corresponding elements are labeled with the same reference numerals. Moreover, although references are made below to directions in describing the structure, they are made relative to the drawings (as normally viewed) for convenience. The directions, such as left, right, upper, lower, etc., are not intended to be taken literally or limit the present invention in any form.

Referring to FIG. 1, the human powered vehicle according to the present invention is illustrated as a conventional bicycle 1 with a propelling mechanism 10 that can be retrofitted to it or integrally formed with it.

A conventional bicycle typically has a front wheel 2, a rear driven wheel 3, a frame 4, and a power transmission mechanism comprising a pair of cranks (not illustrated) driving a front sprocket 6 and a rear wheel sprocket 7 via a chain 8. The frame 4 typically has a steering or head tube 4a, a front fork 4b, a top tube 4c, a seat tube 4d, a down tube 4e, a bottom bracket 4f, a seat stay 4g, and a chain stay 4h. The front fork 4b is rotatably mounted to the head tube 4a and holds the front wheel 2. The down tube 4e, which extends diagonally downwardly from the head tube 4a, connects to the bottom bracket 4f at an angle. The top tube 4c extends typically substantially horizontally or slightly downwardly from the head tube 4a and joins the upper portion of the seat tube 4d, which is typically inclined rearwardly at an angle. The bottom of the seat tube 4d joins the bottom bracket 4f. The seat stay 4g typically joins the seat tube 4d and/or the top tube 4c at one end, and joins the chain stay 4h at the other end. The chain stay 4h also joins the bottom bracket 4f to make the frame rigid. The chain stay and the seat stay form a rear fork that holds the rear wheel 3.

Figure 2:
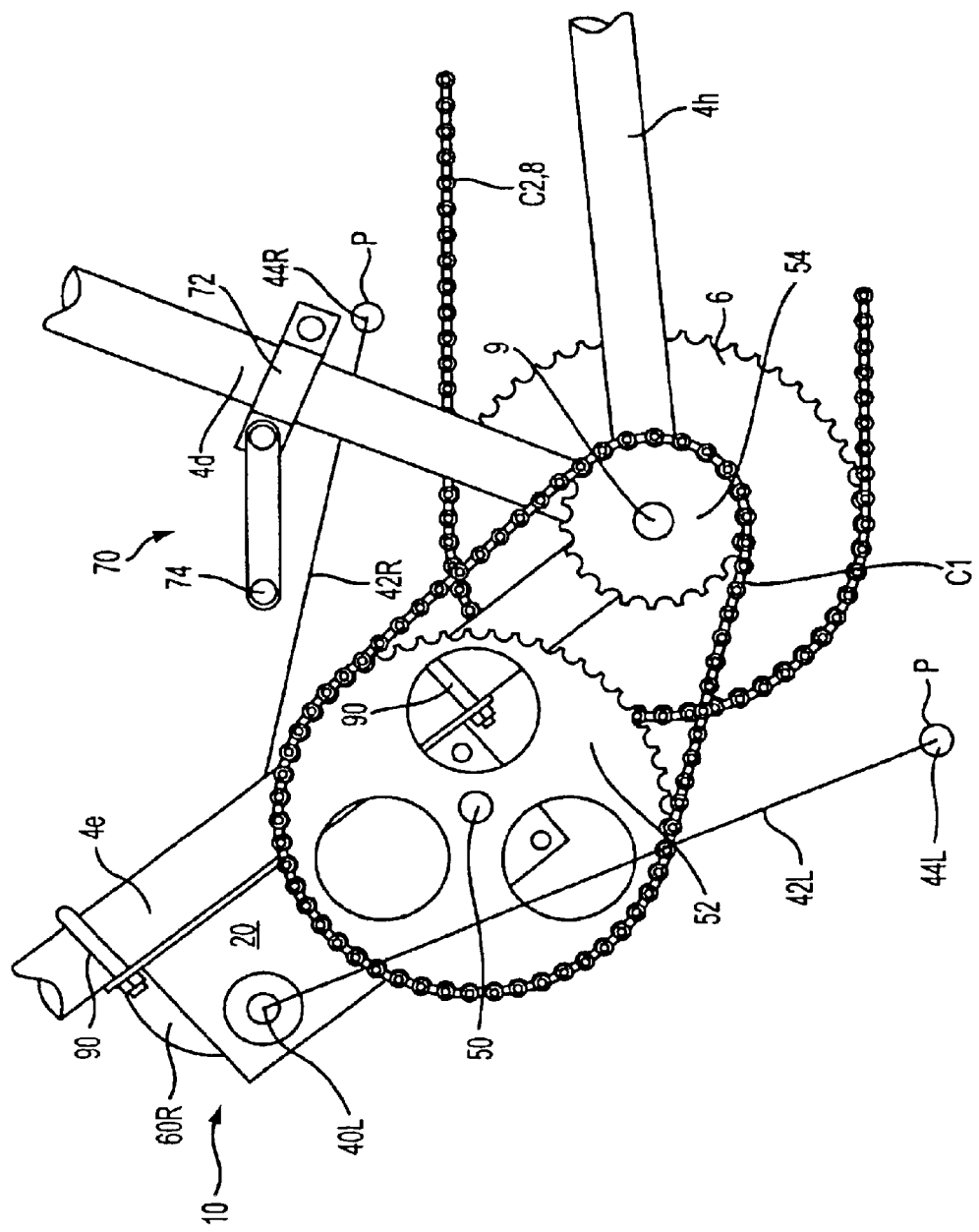
FIG. 2 illustrates a propelling mechanism of FIG. 1 in more detail.
Figure 12:
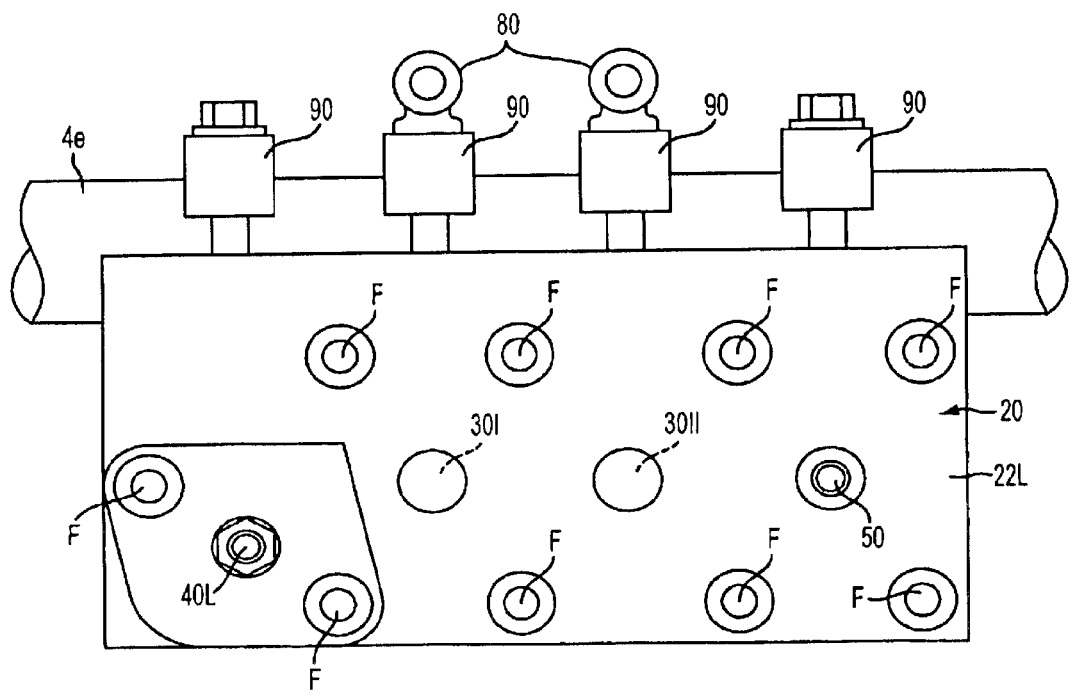
FIG. 12 schematically illustrates a left-side view of the propelling mechanism, illustrating the mounting structure.

Modern day bicycle frames, which can be made of exotic materials, such as titanium, carbon fiber, etc., can have different frame configurations. Nonetheless, most modern day frames at least retain a down tube 4e. In this respect, the propelling mechanism 10 can be mounted to the down tube 4e, as illustrated in FIGS. 1, 2, and 12. This places the propelling mechanism forward of the bottom bracket, which typically holds a conventional crank axle 9. The propelling mechanism according to the present can have crank arms 42L, 42R that are longer than conventional crank arms and a pair of pedals P positioned at distal ends from the crank axle 9 so that their axes 44L, 44R can reciprocate in the opposite directions through an arc that passes or trails behind the crank axle 9 or the bottom bracket 4f Referring to FIGS. 2–5, the propelling mechanism 10 according to the present invention comprises a gearbox or gear train housing 20, a gear train 30 contained in the housing 20, first and second (or right and left) input shafts 40R, 40L rotatably journaled, e.g., using bearing assembly B or the like, to the housing and trained to the gear train, an output shaft 50 rotatably journaled to the housing and trained with the gear train, and first and second crank arms 42R, 42L mounted respectively to the first and second input shafts 40R, 40L for driving the gear train 30. The first crank arm 42R is secured to the first input shaft 40R from the first side of the housing and the second crank arm 42L is secured to the second input shaft 40L from the second side of the housing. The propelling mechanism 10 also includes a conversion mechanism 30C for converting the oppositely reciprocating motion into a unidirectional rotary motion and outputting to the output shaft 50, which can be used to drive the conventional front sprocket 6.

Referring to FIGS. 1 and 2, the power transmission for the present human powered vehicle can include a drive sprocket 52 secured to the output shaft 50 on the first side of the gearbox housing for a right-side power transmission bicycle (or the right side for a left-side power transmission bicycle), a first driven sprocket 54 secured to the axle 9 on the same side of the gearbox housing as the drive sprocket 52, and a first chain C1 interconnecting or training the drive sprocket 52 and the driven sprocket 54. It should be noted that the sprocket 52, 54 can be adapted to fit to the respective shaft/axle 50, 9 by any feasible means known to one of ordinary skill in the art. Moreover, although FIGS. 1 and 2 illustrate the size of the drive sprocket 52 being larger than the driven sprocket 54, depending on the gear ratio desired, the size of the drive sprocket 52 also can be the same or even smaller than the driven sprocket 54. Moreover, at least one chain slack take up or tensioning sprocket can be associated with the chain C1 entraining the drive and driven sprocket 52, 54.

The opposite side of the axle 9 has a second driven sprocket, i.e., the existing sprocket 6 that can drive the rear wheel sprocket 7 using the existing second chain C2 (8). It should be noted that while only a single first driven sprocket 54 and a single second driven sprocket 6 are illustrated, a multiple first or second driven sprockets 54, 6 can be included for changing the gear ratios. Also, the rear sprocket 7 can be a set of multiple sprockets, such as a conventional SHIMANO or SIS compatible cassette.

Figure 8:
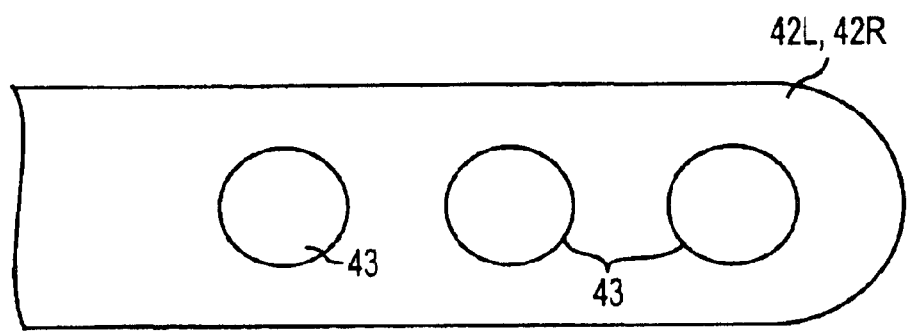
FIG. 8 schematically illustrates the distal end of the crank arm having a plurality of pedal mounting positions.

As previously explained, it s desirable for the crank arms 42R, 42L that are longer than conventional crank arms so that the axes 44R, 44L of their respective pedals P can reciprocate or swing behind the crank axle 9 or the bottom bracket 4f. In this respect, each of the crank arms 42R, 42L can have a length greater than eight inches so that its effective length, as measured from the crank axle 9 to the pedal axle 44R, 44L (center to center between the axles), is between 8–14 inches. Moreover, the effective length can be adjustable, such as by having a plurality of mounting holes for the respective pedals. For example, the distal end of the crank arm 42R, 42L can have a plurality of pedal mounting threaded holes 43, positioned along its length, as illustrated in FIG. 8. By mounting the pedal to one these holes 43, the effective crank arm length can be adjusted. Alternatively, a two-piece crank arm with a plurality of aligning holes can be used. The first piece can be mounted to the respective input shaft 42R, 42L and the second piece can be adjustably mounted to the first piece by bolting at different holes formed along its length. The pedal P can be mounted to the second piece.

Figure 9:
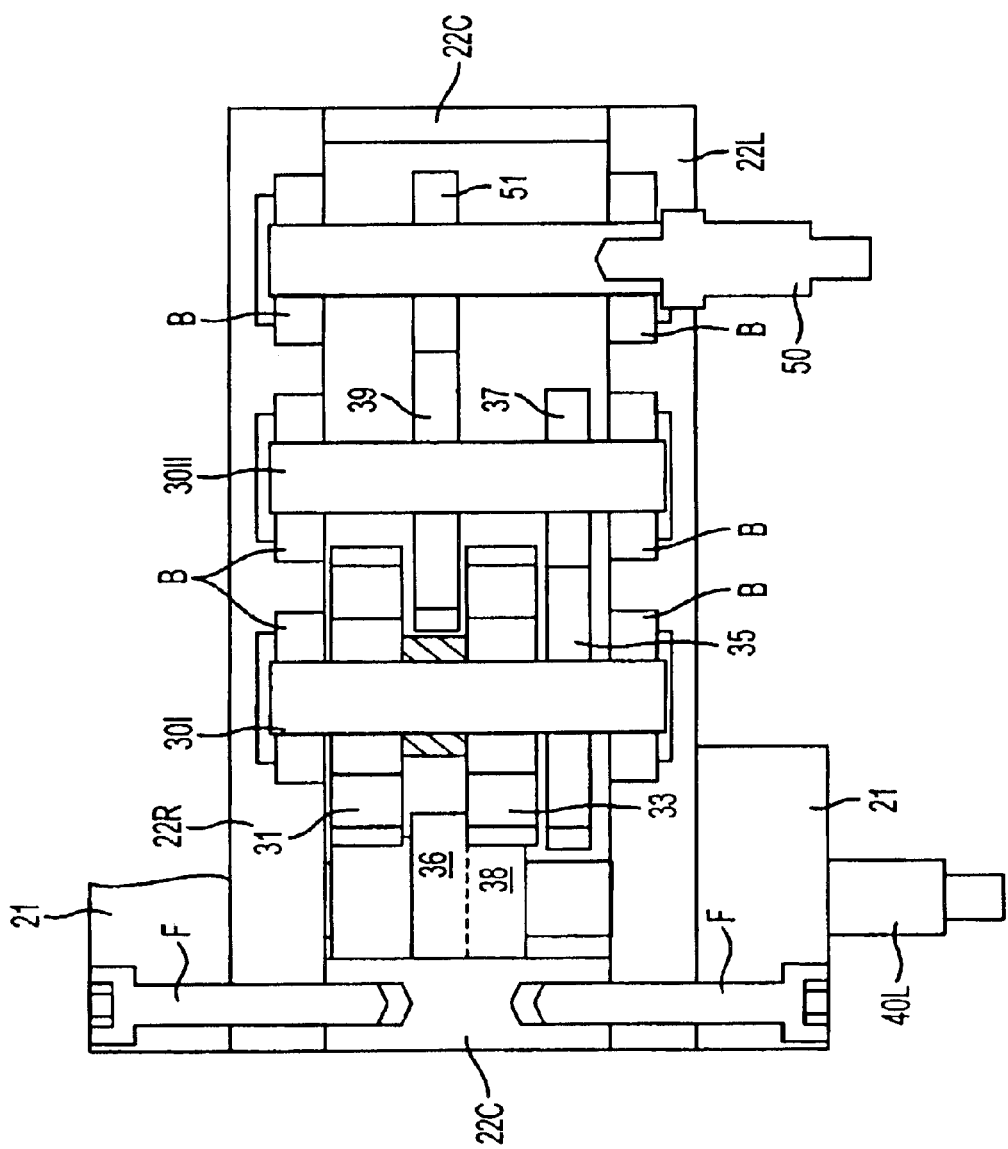
FIG. 9 schematically illustrates a cross-sectional view taken along a second plane of the propelling mechanism similar to FIG. 4, but illustrating another embodiment.
Figure 10:
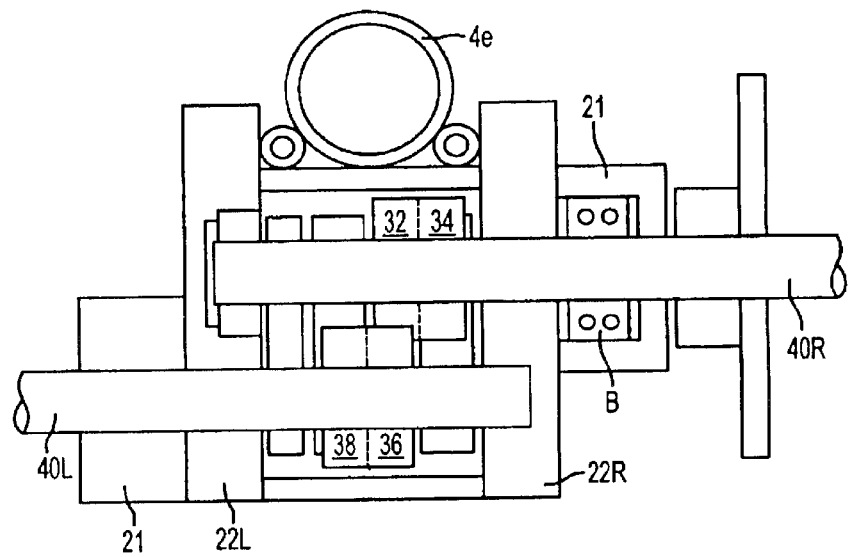
FIG. 10 schematically illustrates a transverse-sectional view taken along a third plane of the propelling mechanism of FIG. 9.
Figure 11:
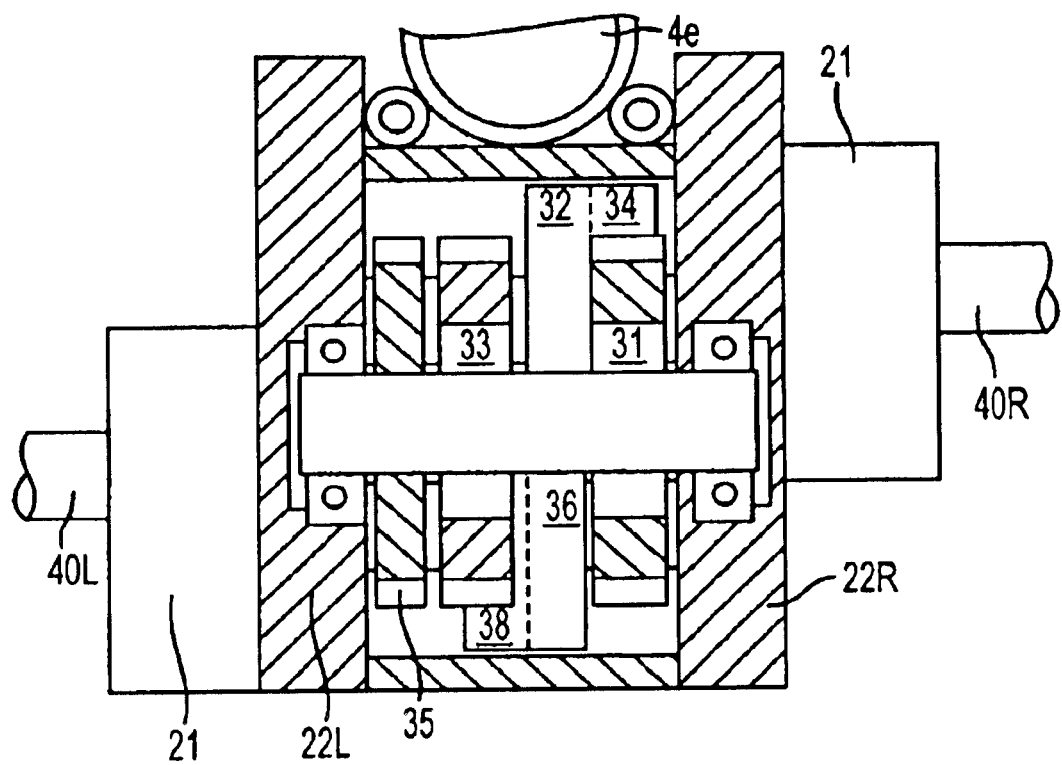
FIG. 11 schematically illustrates a transverse-sectional view taken along a different third plane of the propelling mechanism of FIG. 9.

Referring to FIGS. 4, 5, 14, and 15, the gear train 30 can include first and second gears 32, 34 mounted on one of the first and second shafts 40R, 40L, and third and fourth gears 36, 38 mounted on the other of the first and second shafts 40R, 40L. FIGS. 4, 5, 14, and 15 illustrate the first and second gears and the third and fourth gears as separate and discrete gears. The first and second gears 32, 34, as well as the third and fourth gears 36, 38, however, can be integrally united together or integrally formed, or even formed as a double width gears, as illustrated in the alternative embodiment of FIGS. 9–11. In the alternative embodiment, the first and third gears 32, 36 are positioned between the second and fourth gears 34, 38, as illustrated therein. Again, the gears can be integrally joined or fitted to the shafts or axles using any feasible means known to one of ordinary skill in the art.

Figure 16:
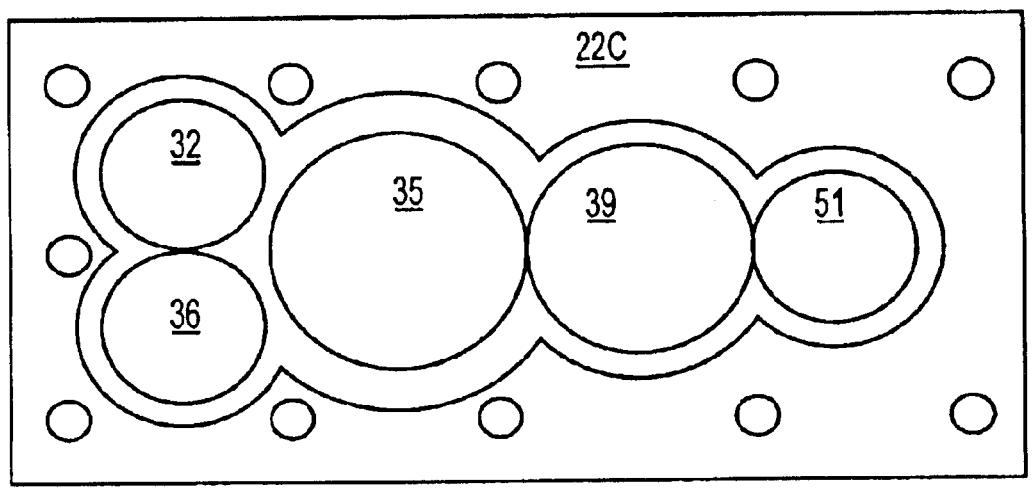
FIG. 16 schematically illustrates a central part of a housing similar to FIG. 13B and the position of the gears for the embodiment of FIG. 14.
Figure 17:
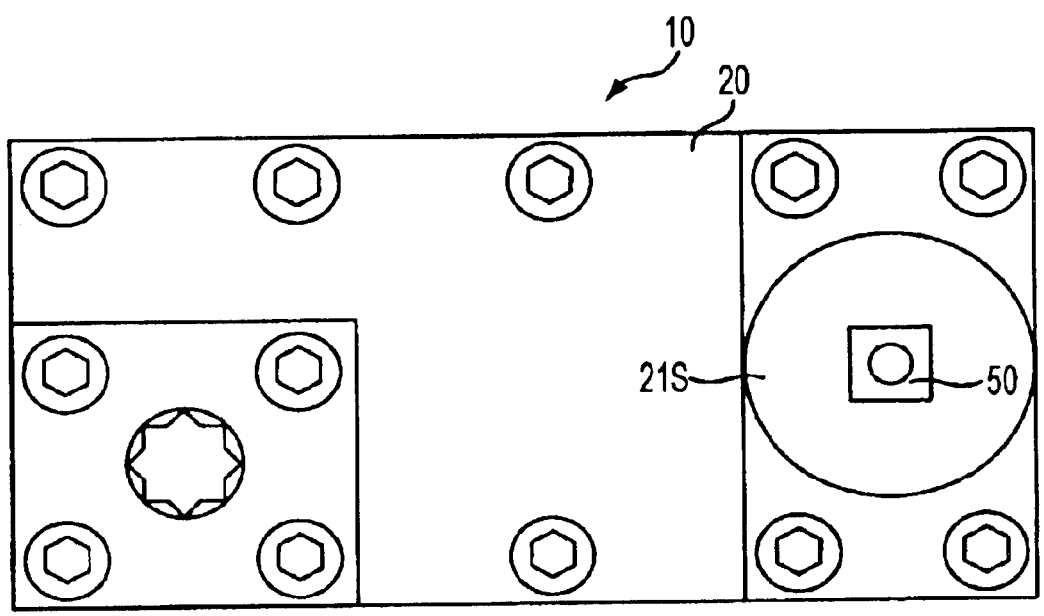
FIG. 17 schematically illustrates a left-side view of the housing that can be used to house the gears of the embodiment of FIG. 14.
Figure 18A:
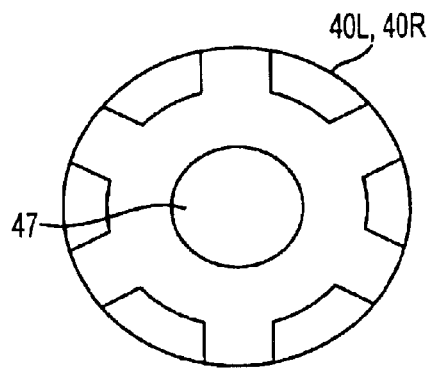
FIGS. 18A–18D schematically illustrate various embodiments of grooves in the shaft that can be used mounting the gears.
Figure 18B:
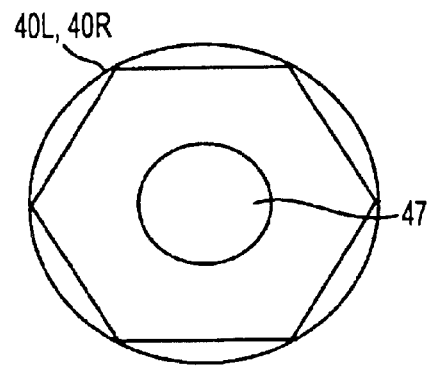
Figure 18C:
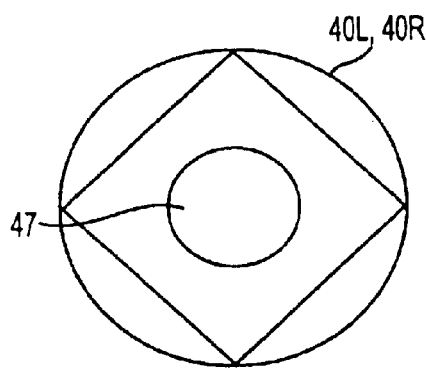
Figure 18D:
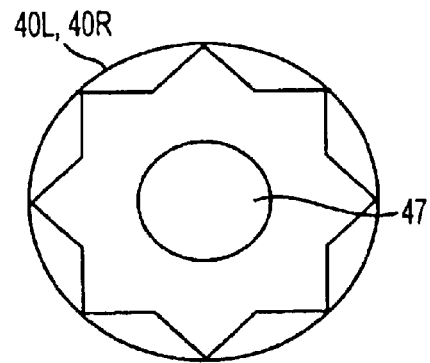

Referring to the embodiments of FIGS. 4, 5, 9–11, 14, and 15, the conversion mechanism 30C can include a third shaft 30I rotatably journaled to the gearbox housing 20, first and second free-wheeled gears 31, 33 mounted on the third shaft 30I. The freewheeled gears 31, 33, can be any conventional type, where they are configured to rotate the third shaft in one direction, but can freely rotate in the opposite direction relative to the third shaft 30I without rotating it in the same direction. The conversion mechanism can further include a fifth gear 35 mounted on the third shaft 30I, a fourth shaft 30II rotatably journaled to the gearbox housing 20, sixth and seventh gears 37, 39 mounted on the fourth shaft, and an eighth gear 51 mounted on the output shaft 50. In the embodiments of FIGS. 4, 5, and 9–11, the fifth gear 35 engages the sixth gear 37 to drive the fourth shaft 30II, and the seventh gear 39 engages the eighth gear 51 to drive the output shaft 50. The embodiment of FIGS. 14 and 15 omits the sixth gear 37 so that the fifth gear 35 directly engages the seventh or intermediary gear 39, which engages the eighth or output gear 51 to drive the output shaft 50. Any one of the fifth, sixth, seventh (intermediary), and eighth (output) gears, and the drive sprocket 35, 37, 39, 51, 52 can be a free-wheeled so that the output shaft 50 does not back drive either the third or fourth shaft 30I, 30II when the drive sprocket 52 is rotated in a reverse to the propelling direction. In the illustrated embodiments, the seventh gear 39 can be freewheeled so that the output shaft does not back drive the fourth shaft 30II. The components, such as gears, freewheeled gears, shafts, and bearings of the present propelling mechanism can be manufactured from existing commercially available components, such as 20 millimeter shafts and bearing assemblies for the same. The embodiment of FIGS. 14–16 has the fifth, intermediary, and output gears 35, 39, 51 all aligned collinearly.

Figure 3:
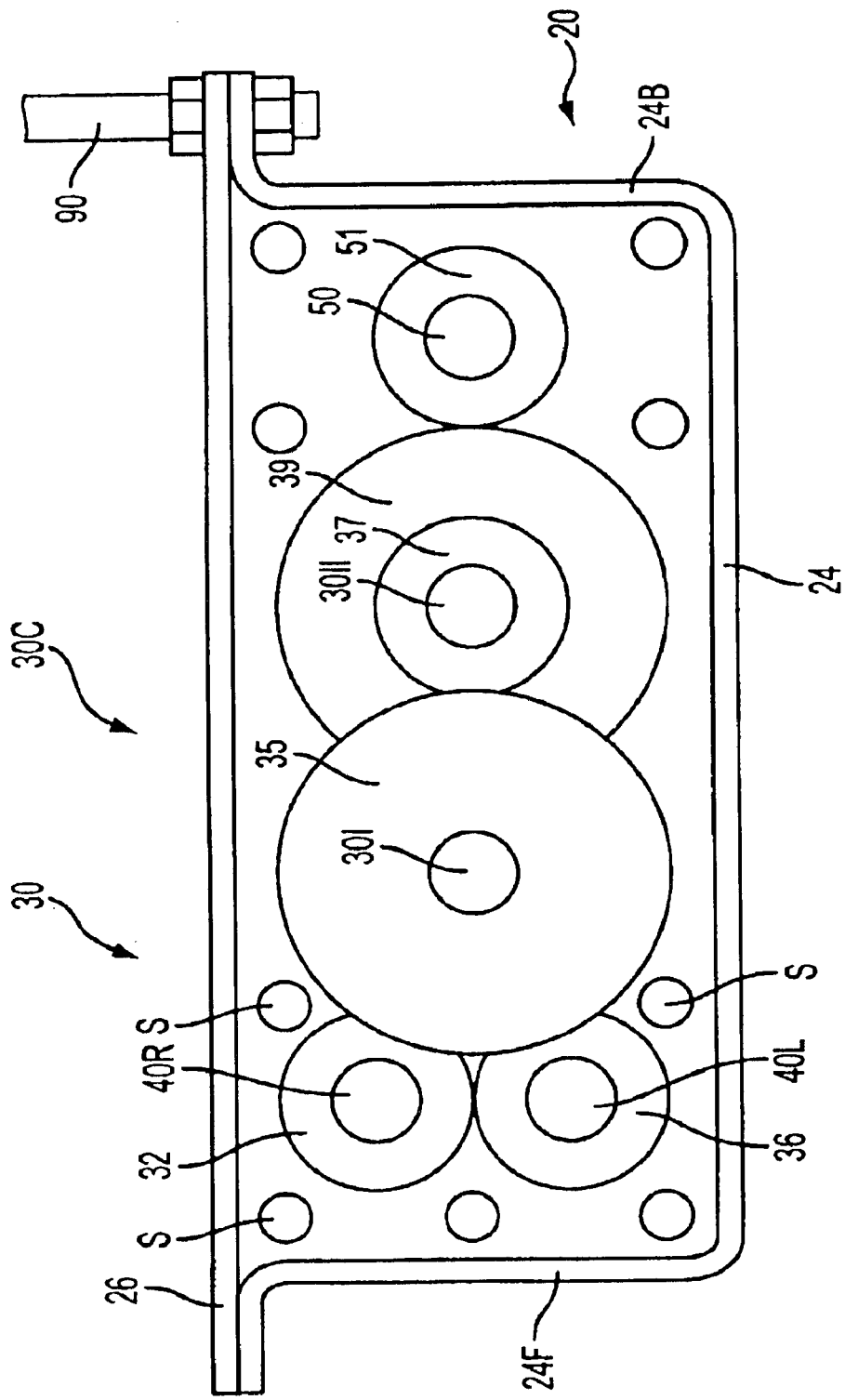
FIG. 3 schematically illustrates a cross-sectional view taken along a first plane of the propelling mechanism of FIG. 2, illustrating its gear train.
Figure 4:
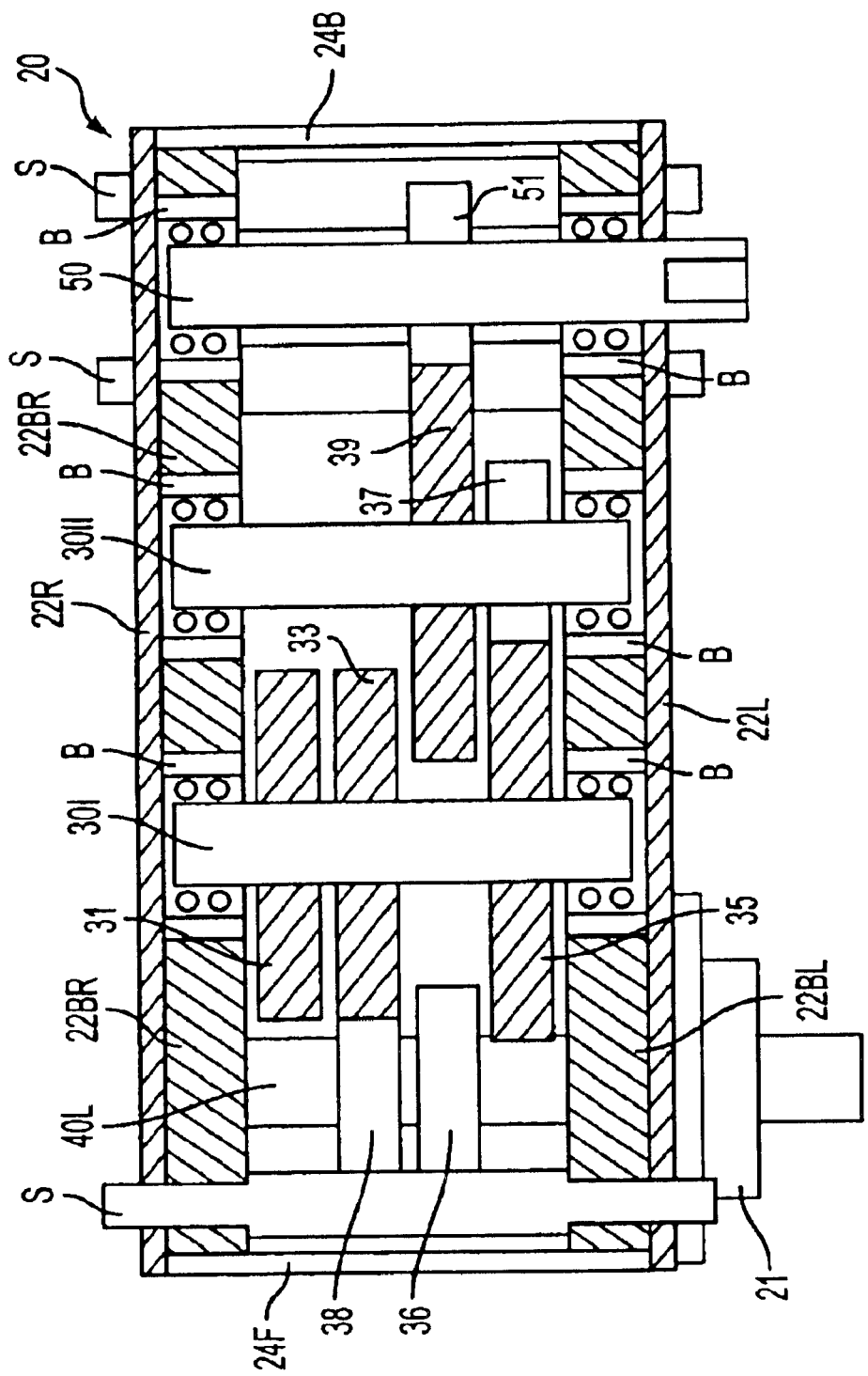
FIG. 4 schematically illustrates a cross-sectional view taken along a second plane of the propelling mechanism of FIG. 2, illustrating its gear train in another view.
Figure 5:
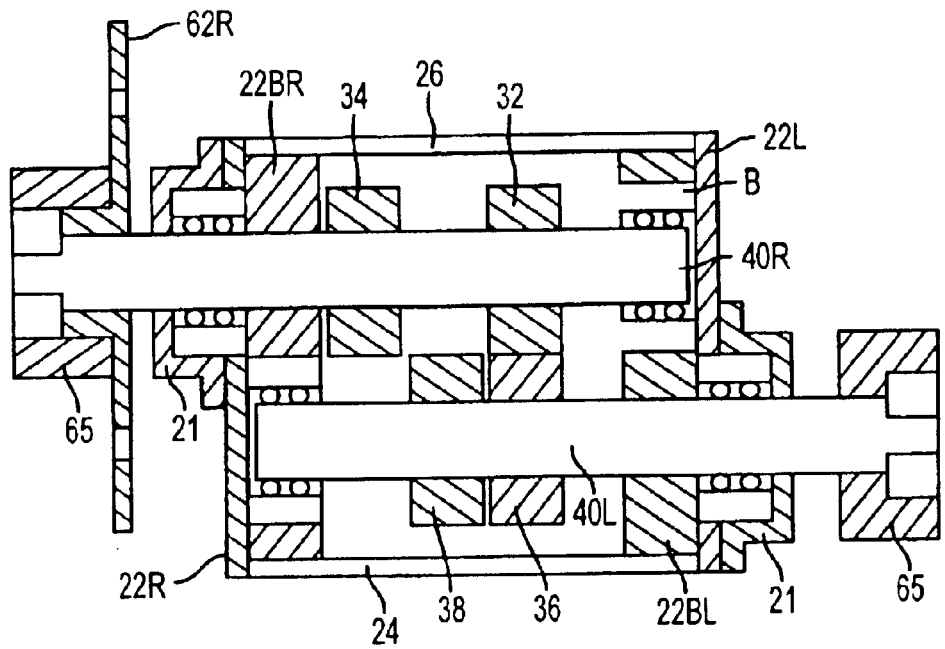
FIG. 5 schematically illustrates a transverse-sectional view taken along a third plane of the propelling mechanism of FIG. 2, illustrating its gear train in yet another view.

Referring to FIGS. 3–5, the housing 20 has right-side and left-side plates 22R, 22L and separate right-side and left-side bearing blocks 22BR, 22BL. These bearings blocks have openings or recesses for seating bearing assemblies B and are aligned to guide the five axles or shafts 40R, 40L, 30I, 30II, 50. The side plates 22R, 22L and the bearing plates 22BR, 22BR can be joined together and held spaced apart using through-bolts S. Referring to FIG. 3, the housing 20 also can have a bottom 24, which can be U-shaped in cross section to cover the bottom and the front 24F and back 24B, and a top 26. The through-bolts S also can hold the bottom 24 and the top 26 (sandwiched between) together with the side plates 22R, 22L and the bearing blocks 22BR, 22BL. The side plates 22R, 22L each can support external components 21, such as a bearing assembly with its own housing for seating the bearing assemblies B close to the ends of the shafts 40R, 40L extending through the housing 20.

FIGS. 13A–13D, 16, and 17 illustrate alternative embodiments of the gearbox housing 20 for the embodiments of FIGS. 9–15. The housing 20 also has a right-side plate 22R and a left-side plate 22L, which can be a mirror image of the right-side plate 22R, and a center part 22C having openings configured to accommodate the gear train 30 and the conversion mechanism 30C. The right-side and left-side plates are connected together to the center part 22C, such as with fasteners F, such as bolts (see FIGS. 9 and 12), sandwiching the center part 22C between the right-side and left-side plates 22R, 22L. Each side plate 22R, 22L has recesses for receiving bearing assemblies R for rotatably journaling or mounting the five shafts 40L, 40R, 30I, 30II, 50 These side plates 22R, 22L have appropriate through holes H for passage of the input and output shafts 40R, 40L, 50.

Figure 13A:
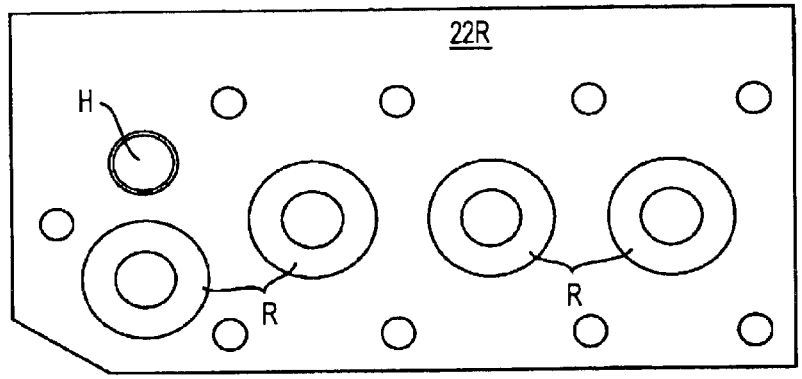
FIGS. 13A–13D schematically illustrate the housing of the propelling mechanism.
Figure 13B:
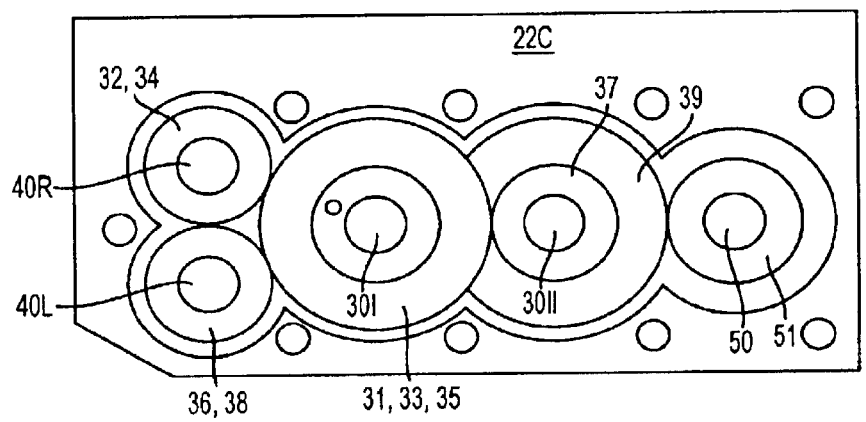
Figure 13C:
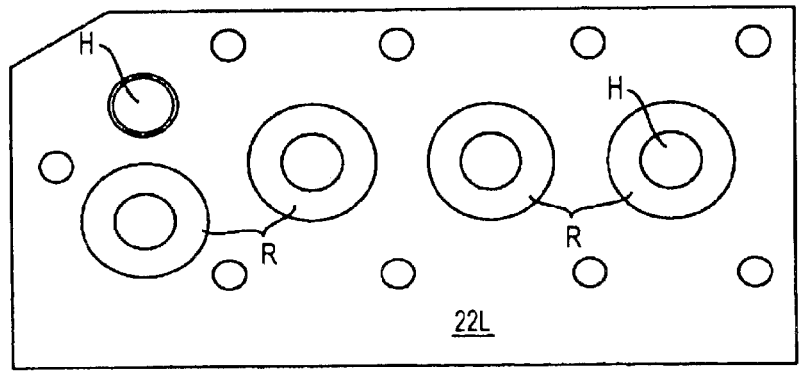
Figure 13D:
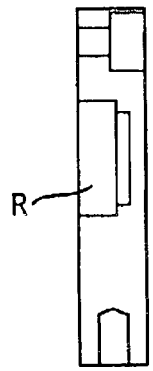
Figure 14:
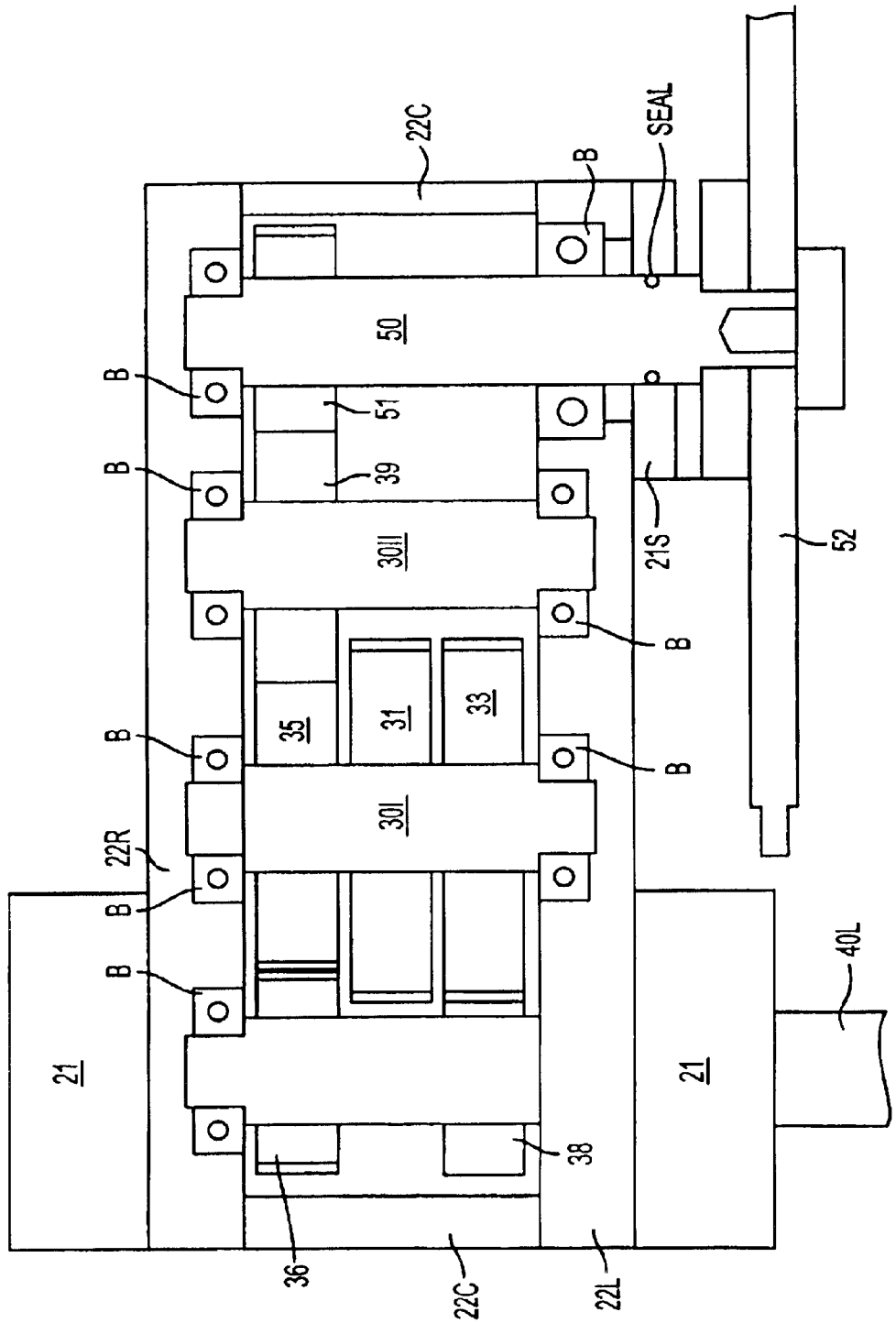
FIG. 14 schematically illustrates a cross-sectional view taken along a second plane of the propelling mechanism similar to the embodiment of FIG. 9, but with different gear arrangement.
Figure 15:
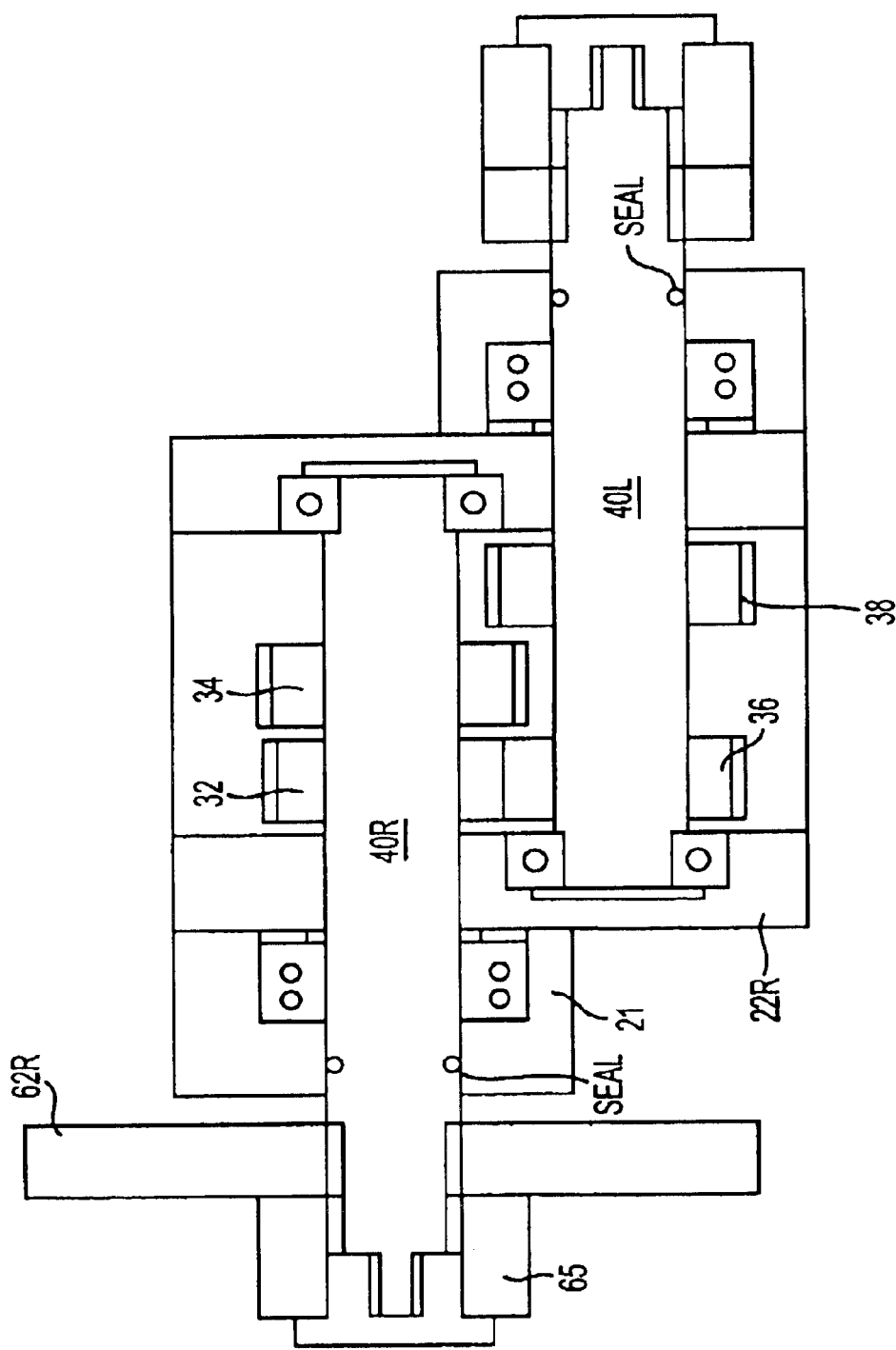
FIG. 15 schematically illustrates a transverse-sectional view taken along a third plane of the propelling mechanism of FIG. 14.

In the illustrated embodiments, the axles, 30I, 30II, and 50 are all aligned along a horizontal center line and oriented parallel with each other. The input shafts 40R, 40L are also parallel with the axles 30I, 30II, and 50, but offset from them, as illustrated in FIGS. 3 and 13B. Specifically, the axles 40R and 40L are vertically aligned and offset from the axes 30I, 30II, 50, as illustrated in FIGS. 3 and 13B. Offsetting the input shafts 40R, 40L one above the other allows the distance between the first shaft 40R and the axle 9 positioned at the bottom bracket to be the same as the distance between the second shaft 40L and the axle 9.

Referring to FIGS. 5–7C, the propelling mechanism 10 according to the present invention can further include an angular adjustment mechanism 60 for angularly adjusting at least one of the first and second crank arms 42R, 42L relative to the other of the first and second crank arms, or respective to its first or second input shaft 40R, 40L. The illustrated embodiment has an angular adjustment mechanism for the first crank arm 42R. Including an angular adjustment mechanism 60 for each of the first and second crank arms, however, can provide a wider range of adjustment and fine tune the angular adjustment.

The angular adjustment mechanism 60 thus can comprise a first disk 62R, 62L secured respectively to the first or second input shaft 40R, 40L, or a first and second disks 62R, 62L both secured respectively to the first and second input shafts 40R, 40L, such as using bolts or an anchoring mechanism 65. The disk 62R, 62L can be attached to the input shafts using any known fastening mechanism. For example, the outer end of the shaft 40R, 40L can be splined or fluted to various non-circular shapes, as illustrated in FIGS. 18A–18D, and the disk 62R, 62L can have a complementary opening that can receive the splined shaft end. The splined end also can have a threaded hole 47 for receiving a fastening bolt, which secures the disk 62R, 62L to the shaft. The first or second crank arm 42R, 42L can be directly secured to the respective shaft 40R, 40L, for example, using an adapter 46. The adapter 46 can have an opening 43 complementary to the splined end of the shaft so that it can be mounted directly to the shaft, similar to the way the disk 62R, 62L is mounted to the shaft. The adapter can have a pair of openings 48 through which the crank arm 42R, 42L can be mounted to it using fasteners, such as bolts or the like. In this respect, the crank arm 42R, 42L can have three openings 48C aligned with the three openings 43, 48 to permit passage of threaded bolts. It should be noted that the gears, made with workable steel and alloys, can be mounted to shaft using similar spline configuration.

The first or second crank arm 42R, 42L can be adjustably secured respectively to the first or second disk 62R, 62L, or both first and second crank arms 42R, 42L adjustably secured respectively to the first and second disks 62R, 62L. The first and second disks can be identical or mirror image of each other. Each disk can have a plurality of positioning holes 64 through which the respective first or second crank arm 42R, 42L can be bolted. The holes 64 can be positioned concentrically with the disk, which can be circular, and the respective crank arm 42R, 42L can be bolted to the respective disk 62R, 62L through at least a pair of diametrically opposing positioning holes 64, as illustrated in FIG. 6, or mounted offset to a pair of holes 64, as illustrated in FIG. 7A.

Figure 6:
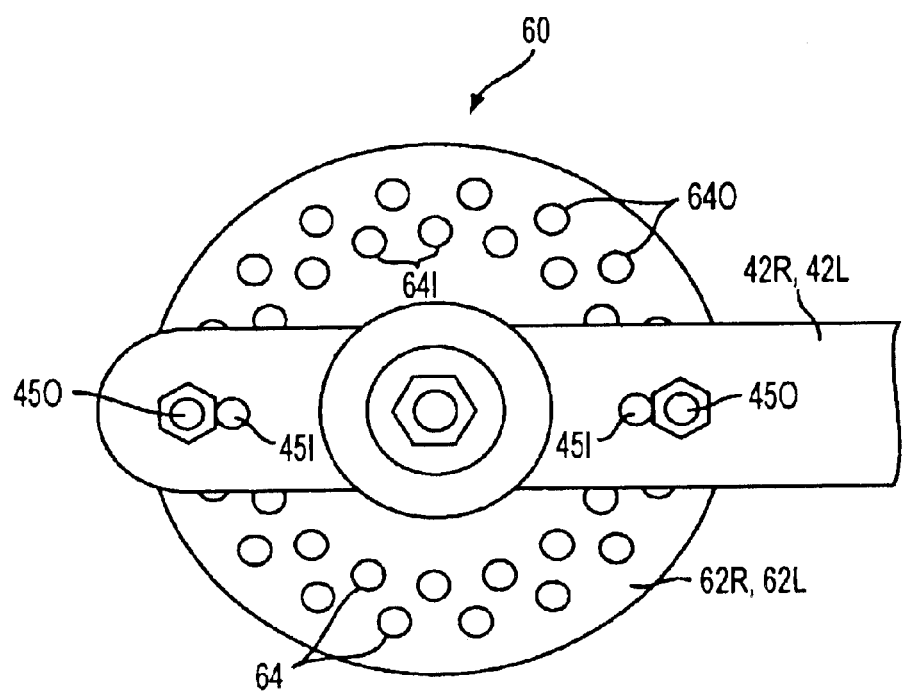
FIG. 6 schematically illustrates one embodiment of a crank-arm angle adjustment mechanism according to the present invention.
Figure 7:
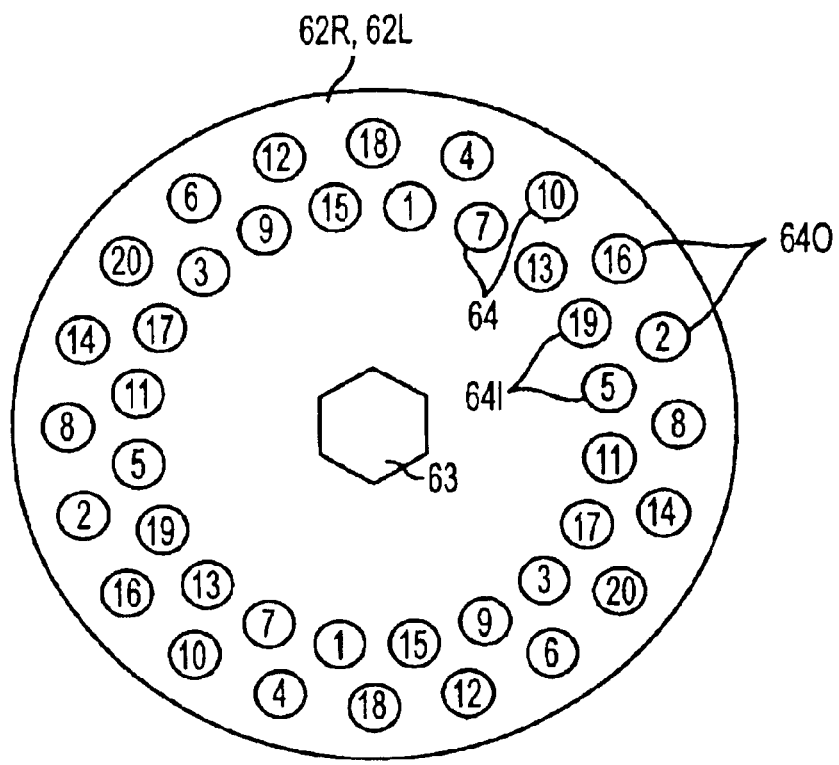
FIG. 7 schematically illustrates another embodiment of a crank-arm angle adjustment mechanism according to the present invention.
Figure 7A:
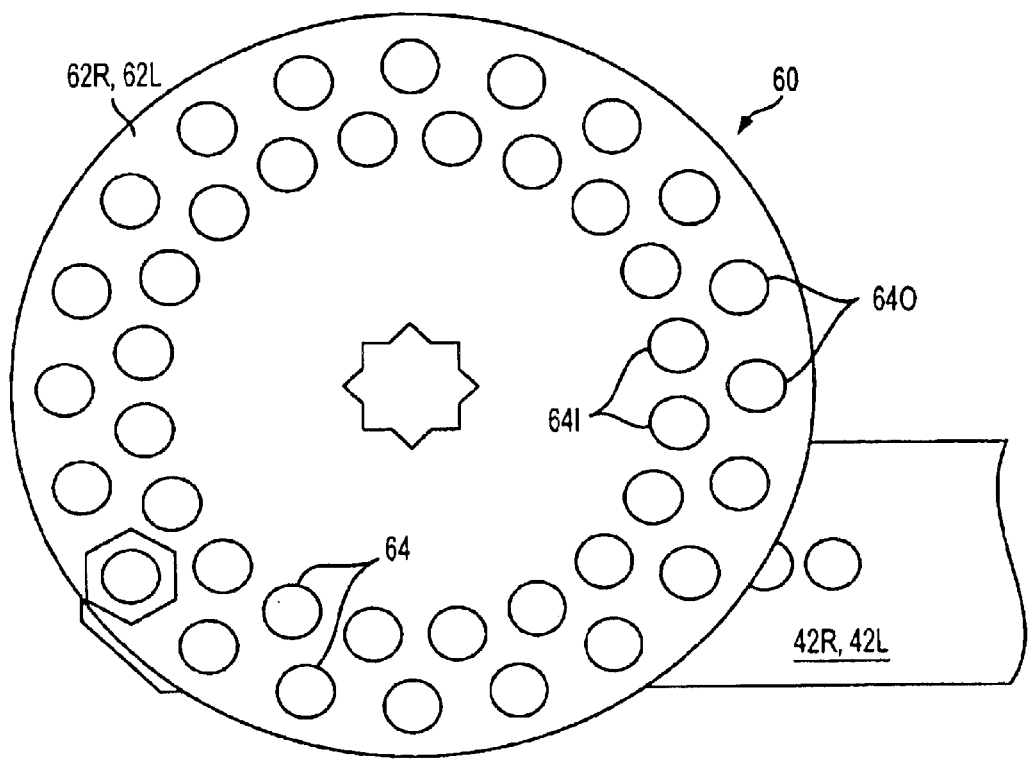
FIG. 7A schematically illustrates another embodiment of a crank-arm angle adjustment-mechanism according to the present invention.
Figure 7B:
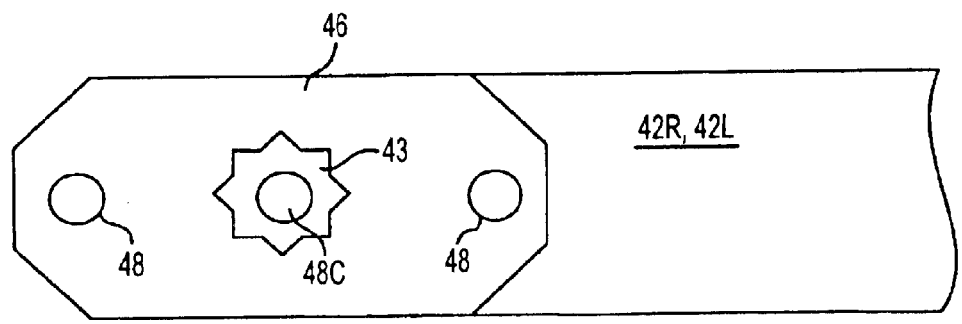
FIG. 7B schematically illustrates an adaptor for fitting a crank arm to a crank shaft or axle.

Each disk can have inner and outer concentric circular arrays 64I, 64O of positioning holes 64 to allow for a greater degree of adjustment, as illustrated in FIGS. 6, 7, and 7A. In this respect, each crank arm 42R, 42L can have at least two pairs of holes 45O, 45I, one pair 45I for mounting to the inner circular array 64I of positioning holes and the other pair 45O for mounting to the outer circular array 64O of positioning holes.

Each disk can have any number of positioning holes greater than 4. In the embodiment illustrated in FIG. 6, the number of positioning holes 64 is 36, 18 holes in each of the inner and outer arrays 64I, 64O. In the embodiments illustrated in FIGS. 7 and 7A, the number of positioning holes is 40, 20 holes in each of the inner and outer arrays 64I, 64O. The holes in each array 64I, 6O can be equally spaced apart in a circular pattern, concentric with the disk 62R, 62L, as illustrated in FIGS. 6, 7, and 7A, or can be patterned at different spacing in a circular pattern. To provide a greater degree of adjustment, the holes in the inner and outer arrays 64I, 64O can be staggered, as illustrated in FIGS. 6, 7, and 7A. Circumferentially staggering the positioning holes of the outer circular array 64O relative to the positioning holes of the inner circular array 64I, allows half-step adjustments. That is, referring to the embodiment of FIG. 6, the positioning holes 64 of each of the inner and outer circular arrays 64I, 64O are spaced at 20° intervals. Since the inner and outer arrays are staggered, the spacing between adjacent holes of the staggered positioning holes can be set at 10° intervals, which is half of the adjacent spacing of the holes of the inner or outer arrays. Similarly, in the embodiment of FIGS. 7 and 7A, the positioning holes 64 of each of the inner and outer circular arrays 64I, 64O are spaced at 18° intervals. Thus, the spacing between adjacent holes of the staggered positioning holes can be set at 9° intervals, which is half of the adjacent spacing of the holes of the inner or outer arrays.

Each 10° space can shifts the oscillation mid-point by 5°, which represents about 3 centimeters at pedal axle 44L, 44R for a crank arm having a 14 inch effective length. The mid-point position of the oscillations can be chosen based on the desired maximum amplitude (as defined by the position of the stop 70, 70H) and the ground clearance.

Each of the first and second disks 62L, 62R can have a hexagonal hole 63 (see FIG. 7) or any other non-circular configuration (see FIG. 7A), and the respective first or second input shafts 40L, 40R can have a complementary end (see FIGS. 18A–18D) that mates with the hole 63. The hexagonal hole allows a quick 60° shift interval of the respective disk relative to the input shaft 40R, 40L, providing additional angular adjustments. This allows the first and third gears 32, 36 of the first and second input shafts 40L, 40R to shift by 120° and allows the first and second freewheeled gears 31, 33 associated with the third shaft 30I to shift by 60°.

Figure 7C:
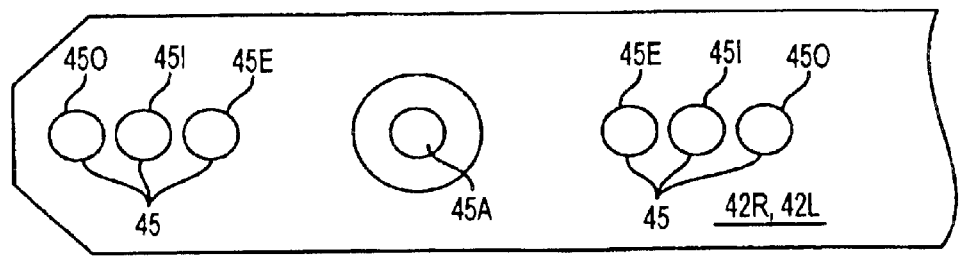
FIG. 7C schematically illustrates a crank arm adapted for mounting to an adjustment disk.

Referring to FIGS. 7A and 7C, one or both crank arms 42R, 42L can be mounted offset relative to the input shaft 40R, 40L. For example, the crank arm 42R, 42L can have a series of openings 45 that are spaced to match both the inner or outer holes 64I, 64O of the disk 62R, 62L, as previously explained using inner and outer holes 45I, 45O. See FIG. 6. The crank arm 42R, 42L can further include additional holes 45E so that it can be mounted offset from the axle, i.e., not using diametrically opposite holes. For example, if the inner and outer circular arrays of holes 64I, 64O have 42 and 52 mm radius, each array having 20 equally spaced holes, the outer array 64O can create a gap of 84 mm between any six consecutive holes (sector of 54°). This can displace the crank arm 31 mm below the shaft (as illustrated in FIG. 7A) or 31 mm above it if mounted above the shaft. In this respect, the holes 45 in the crank arm can be set at 32–42–52 mm from the axle opening 45A in both directions, creating six discrete holes. This allows three possible combinations that provide 84 mm distance: 52+32 mm as shown in FIG. 7A, 42+42 mm, and 32+52 mm. Instead of discrete holes 45, the crank arm can have a pair of slots, which allow even greater degree of adjustment.

The propelling mechanism can further include a stop 70, 70H for limiting the pivoting movement of each crank arm 42R, 42L. The stop 70, 70H can be mounted to the bicycle frame 4 or the gearbox housing 20 for limiting the reciprocating movement of the crank arms 42R, 42L. For instance, referring to FIG. 1, the stop 70H can be mounted to the housing 20. Referring to FIG. 2, the stop 70 can be mounted to the seat tube 4d via a conventional tube clamp 72. The stop 70 can include an arm 74 adjustably mounted to or adjustably extends from the tube clamp 72. The arm 74 can be adjustably angled relative to the clamp 72 so that its position relative to one of the crank arms 42L, 42R is adjustable. Moreover, the stop position also can be adjusted by moving the tube clamp 72 up and down the seat tube 4d. Since the movement of the first and second crank arms 42L, 42R are synchronized with the first gear 32 engaging the third gear 36, the stop 70, 70H need to engage only one of the first and second crank arms 42L, 42R.

The crank arms 42L, 42R can have an amplitude of oscillation exceeding 14 inches for a 14 inch crank (effective length), which can be limited with the stop 70. The stop 70 thus acts as an upper limit of the oscillation.

Referring to FIG. 12, the propelling mechanism can further include one or more anti-theft rings 80 for attaching an anti-theft device, such as a U-lock, chain, etc. In this respect, the anti-theft rings 80 can be attached to the gearbox housing 20, along the down tube 4e. Moreover, the gearbox housing can be mounted to the down tube with at least two fasteners 90, such as a U-bolt. The embodiment of FIG. 12 illustrates four U-bolts.

The present invention thus provides a method of coupling an external propelling mechanism to any bicycle frame, namely to the down tube 4e using U-bolts or the like, and driving the front sprocket 6 using an external chain C1 and a primary driving sprocket 52 fixed to the output shaft 50 of the propelling mechanism and a secondary driving sprocket 54 fixed to an existing crank axle 9 (instead of a crank arm) so that the existing power transmission (on the right-hand side in the illustrated embodiment) is used.

The propelling mechanism thus can contain housing 20, a gear train 30, and a conversion mechanism 30C for: 1) rotatably supporting the first and second shafts 40R, 40L, each bearing a crank arm 42R, 42L; 2) providing the reverse oscillations of the crank arms using a pair of superposed gear wheels 32, 36 on the shafts 40R, 40L; 3) converting the reciprocating movements of the first and second shafts 40R, 40L into a unidirectional rotary motion by engaging first and second freewheels 31, 33 mounted to a third shaft 30I, which is rotatably journaled to the housing 20, to another pair of superposed gear wheels 34, 38 on the input shafts 40R, 40L; 4) and driving the output shaft 50, which is rotatably journaled to the housing, using the unidirectional motion driving the third shaft 30I. In this respect, the conversion mechanism can include a superposed stepping up gears 35, 37, one superposed to the third shaft 30I and another superposed to a fourth shaft 30II, which is also rotatably journaled to the housing 20, to step up the rotational speed of the third shaft 30I, and additional gears 39, 51, one superposed on the fourth shaft 30II and another superposed on the output shaft 50 so that a suitable internal transmission ratio is obtained, one which is combinable or compatible with the variable gear ratios of the existing power transmission. The crank arm allows about a 180° rotation of the conventional crank axle 9 for a given amplitude of oscillation and given crank arm length.

Given the disclosure of the present invention, one versed in the art would appreciate that there may be other embodiments and modifications within the scope and spirit of the present invention. Accordingly, all modifications attainable by one versed in the art from the present disclosure within the scope and spirit of the present invention are to be included as further embodiments of the present invention. The scope of the present invention accordingly is to be defined as set forth in the appended claims.

The disclosure of the parent application, PCT/FR99/01477, in their entirety, including the drawings, claims, and the specification thereof, is incorporated herein by reference.

I claim:

1. A human powered vehicle comprising:
a frame;
a front wheel attached to the frame;

a back wheel attached to the frame;
a power transmission mounted to the frame for driving the back wheel, said power transmission including a front sprocket rotatably supported on the frame by a crank axle, a rear wheel sprocket connected to the back wheel and a chain interconnecting the front and rear wheel sprockets;
a propelling mechanism comprising:
a gearbox housing;
first and second shafts each rotatably journaled to the housing;
first and second crank arms, wherein the first crank arm is secured to the first shaft from one side of the housing and the second crank arm is secured to the second shaft from the opposite side of the housing;
a gear train including first and second gears mounted on the first shaft, third and fourth gears mounted on the second shaft;
a conversion mechanism; and
an output shaft rotatably journaled to the housing,
wherein each of the first and second crank arms has a length greater than eight inches,
wherein the first gear engages the third gear so that the first and second crank arms pivot in opposite directions,
wherein the conversion mechanism is trained with the second and fourth gears for converting the reciprocating pivoting movements of the second and fourth gears driven by the first and second crank arms into a unidirectional rotation,
wherein the output shaft is trained with the conversion mechanism and trained to the power transmission by a drive sprocket disposed on the output shaft, a driven sprocket disposed on the crank axle and a chain training the drive sprocket and the driven sprocket, for driving the back wheel.

2. A human powered vehicle according to claim 1, wherein the frame is a bicycle frame having a bottom bracket, the power transmission including an axle rotatably journaled to the bottom bracket, wherein the gearbox housing is located in front of the bottom bracket.

3. A human powered vehicle according to claim 2, wherein the bicycle frame further has a head tube and a down tube interconnecting the head tube and the bottom bracket, wherein the gearbox housing is removably attached to the down tube so that the entire gearbox housing is located in front of the bottom bracket.

4. A human powered vehicle according to claim 2, wherein the drive sprocket is secured to the output shaft on one outer side of the gearbox housing, and the first driven sprocket is secured to the axle on the same side of the gearbox housing as the drive sprocket.

5. A human powered vehicle according to claim 4, wherein the front sprocket is secured to the crank axle on the opposite side of the driven sprocket.

6. A human powered vehicle according to claim 2, wherein the first and second shafts and the axle are parallel, and wherein the first and second shafts are offset one above the other so that the distance between the first shaft and the axle is the same as the distance between the second shaft and the axle.

7. A human powered vehicle according to claim 1, wherein an effective length of each crank arm is between 8–14 inches.

8. A human powered vehicle according to claim 1, wherein the effective length of each crank arm is 14 inches.

9. A human powered vehicle according to claim 1, wherein an effective length of the crank arm is adjustable.

10. A human powered vehicle according to claim 3, further including a stop for limiting the pivoting movement of each crank arm.

11. A human powered vehicle according to claim 10, wherein the bicycle frame further includes a seat tube extending from the bottom bracket and the stop is mounted to the seat tube.

12. A human powered vehicle according to claim 10, wherein the stop is mounted underneath the gearbox housing.

13. A human powered vehicle according to claim 2, wherein the first and second crank arms extend rearwardly from the respective first and second shafts so that the first and second crank arms reciprocate in the opposite directions through an arc that passes behind the axle.

14. A human powered vehicle according to claim 1, wherein the gearbox housing further includes an anti-theft ring for attaching an anti-theft device.

15. A human powered vehicle according to claim 3, wherein the gearbox housing is mounted to the down tube with at least two U-bolts.

16. A human powered vehicle, comprising:
a frame;
at least one front wheel attached to the frame;
at least one back wheel attached to the frame;
a power transmission mounted to the frame for driving at least one of the wheels;
a propelling mechanism comprising:
a gearbox housing;
first and second shafts each rotatably journaled to the housing;
first and second crank arms, wherein the first crank arm is secured to the first shaft from one side of the housing and the second crank arm is secured to the second shaft from the opposite side of the housing;
a gear train including first and second gears mounted on the first shaft, third and fourth gears mounted on the second shaft;
a conversion mechanism; and
an output shaft rotatably journaled to the housing,
wherein the first gear engages the third gear so that the first and second crank arms pivot in opposite directions,
wherein the conversion mechanism is trained with the second and fourth gears for converting the reciprocating pivoting movements of the second and fourth gears driven by the first and second crank arms into a unidirectional rotation,
wherein the output shaft is trained with the conversion mechanism and trained to the power transmission for driving the one wheel, and
wherein the conversion mechanism includes a third shaft rotatably journaled to the gearbox housing and first and second free-wheeled gears mounted on the third shaft, wherein the first and second free-wheeled gears engage the second and fourth gears respectively and are configured to rotate the third shaft in one direction, but rotate in the opposite direction without rotating the third shaft.

17. A human powered vehicle according to claim 16, wherein the conversion mechanism further includes a fifth gear mounted on the third shaft, a fourth shaft rotatably journaled to the housing, sixth and seventh gears mounted on the fourth shaft, and an eighth gear mounted to the output shaft, wherein the fifth gear engages the sixth gear to drive the fourth shaft and the seventh gear engages the eighth gear to drive the output shaft.

18. A human powered vehicle according to claim 16, wherein the conversion mechanism further includes a fifth gear mounted on the third shaft, a fourth shaft rotatably journaled to the housing, an intermediary gear mounted on the fourth shaft, and an output gear mounted to the output shaft, wherein the fifth gear engages the intermediary gear to drive the fourth shaft and the output gear engages the intermediary gear to drive the output shaft.

19. A human powered vehicle according to claim 17, wherein the first and second gears are integrally united together and the third and fourth gears are united together, and wherein the first and third gears are positioned between the second and fourth gears.

20. A human powered vehicle according to claim 17, wherein one of the fifth, sixth, seventh, and eighth gears is free-wheeled so that the output shaft does not back drive either the third or fourth shaft when the output shaft is rotated in reverse to the propelling direction.

21. A human powered vehicle according to claim 20, wherein the seventh gear is freewheeled so that the output shaft does not back drive the fourth shaft.

22. A human powered vehicle according to claim 16, wherein each of the first and second crank arms has a length greater than eight inches.

23. A human powered vehicle comprising:
 a frame;
 at least one front wheel attached to the frame;
 at least one back wheel attached to the frame;
 a power transmission mounted to the frame for driving at least one of the wheels;
 a propelling mechanism comprising;
  a gearbox housing;
  first and second shafts each rotatably journaled to the housing;
  first and second crank arms, wherein the first crank arm is secured to the first shaft from one side of the housing and the second crank arm is secured to the second shaft from the opposite side of the housing;
  a gear train including first and second gears mounted on the first shaft, third and fourth gears mounted on the second shaft;
  a conversion mechanism; and
  an output shaft rotatably journaled to the housing,
   wherein the first gear engages the third gear so that the first and second crank arms pivot in opposite directions,
   wherein the conversion mechanism is trained with the second and fourth gears for converting the reciprocating pivoting movements of the second and fourth gears driven by the first and second crank arms into a unidirectional rotation,
   wherein the output shaft is trained with the conversion mechanism and trained to the power transmission for driving the at least one back wheel, and
   wherein the propelling mechanism further includes means for mounting at least one of the first and second crank arms offset from the respective shaft.

24. A human powered vehicle according to claim 23, wherein each of the first and second crank arms has a length greater than eight inches.

25. A human powered vehicle, comprising:
 a frame;
 at least one front wheel attached to the frame;
 at least one back wheel attached to the frame;
 a power transmission mounted to the frame for driving at least one of the wheels;
 a propelling mechanism comprising:
  a gearbox housing;
  first and second shafts each rotatably journaled to the housing;
  first and second crank arms, wherein the first crank arm is secured to the first shaft from one side of the housing and the second crank arm is secured to the second shaft from the opposite side of the housing;
  a gear train including first and second gears mounted on the first shaft, third and fourth gears mounted on the second shaft;
  a conversion mechanism; and
  an output shaft rotatably journaled to the housing,
   wherein the first gear engages the third gear so that the first and second crank arms pivot in opposite directions,
   wherein the conversion mechanism is trained with the second and fourth gears for converting the reciprocating pivoting movements of the second and fourth gears driven by the first and second crank arms into a unidirectional rotation,
   wherein the output shaft is trained with the conversion mechanism and trained to the power transmission for driving the at least one back wheel, and
   wherein the propelling mechanism further includes an angular adjustment mechanism for angularly adjusting at least one of the first and second crank arms relative to the respective first or second shaft.

26. A human powered vehicle according to claim 25, wherein the angular adjustment mechanism comprises at least a first disk secured to one of the first and second shafts.

27. A human powered vehicle according to claim 25, wherein the angular adjustment mechanism comprises first and second disks secured respectively to the first and second shafts, and wherein the first and second crank arms are adjustably secured respectively to the first and second disks.

28. A human powered vehicle according to claim 27, wherein the first and second disks each have a plurality of positioning holes, the first and second crank arms being bolted to the respective disks through at least a pair of positioning holes.

29. A human powered vehicle according to claim 28, wherein each of the first and second disks has inner and outer concentric circular arrays of positioning holes.

30. A human powered vehicle according to claim 29, wherein each of the first and second crank arms has at least two pairs of holes, one pair for mounting to the inner circular array of positioning holes and the other pair for mounting to the outer circular array of positioning holes.

31. A human powered vehicle according to claim 30, wherein at least one of the first and second crank arms has a third pair of holes, wherein the one crank arm is mountable to the respective disk offset from the respective shaft.

32. A human powered vehicle according to claim 29, wherein the number of positioning holes in each of the first and second disks is one of 36 or 40.

33. A human powered vehicle according to claim 32, where each circular array of positioning holes has 18 position holes, and wherein the 18 positioning holes of each circular array are equally spaced, and the positioning holes of the inner circular array being circumferentially staggered relative to the positioning holes of the outer circular array.

34. A human powered vehicle according to claim 32, where each circular array of positioning holes has 20 position holes, and wherein the 20 positioning holes of each circular array are equally spaced, and the positioning holes of the inner circular array being circumferentially staggered relative to the positioning holes of the outer circular array.

35. A human powered vehicle according to claim 33, wherein the positioning holes of each of the inner and outer circular arrays are spaced at 20° intervals, and wherein the spacing between adjacent holes of the staggered positioning holes are spaced at 10° intervals.

36. A human powered vehicle according to claim 34, wherein the positioning holes of each of the inner and outer circular arrays are spaced at 18° intervals, and wherein the spacing between adjacent holes of the staggered positioning holes are spaced at 9° intervals.

37. A human powered vehicle according to claim 27, wherein each of the first and second disks has a hexagonal hole, and the respective first or second shaft has a hexagonal end that mates with the hexagonal hole, the hexagonal hole allowing a quick 60° shift interval of the respective disk relative to the shaft.

38. A human powered vehicle according to claim 26, wherein the at least first disk has an opening in which an end of one of the first and second shafts is received, the opening having a predetermined shape, the end the one of the first and second shafts having a complementary cross-sectional shape.

39. A human powered vehicle according to claim 38, wherein the complementary cross-sectional shape is selected from one of square, hexagonal, octagrammic and splined.

40. A human powered vehicle according to claim 27, wherein the first and second disks respectively have openings in which ends of each of the first and second shafts are received, the openings having a predetermined shape, the ends of the first and second shafts having a complementary cross-sectional shape.

41. A human powered vehicle according to claim 40, wherein the complementary cross-sectional shape is selected from one of square, hexagonal, octagrammic and splined.

42. A human powered vehicle according to claim 25, wherein each of the first and second crank arms has a length greater than eight inches.

43. A propelling mechanism securable to a human powered vehicle, comprising:
   a gearbox housing;
   first and second shafts each rotatably journaled to the housing;
   first and second crank arms, wherein the first crank arm is secured to the first shaft from one side of the housing and the second crank arm is secured to the second shaft from the opposite side of the housing;
   a gear train including first and second gears mounted on the first shaft, third and fourth gears mounted on the second shaft;
   a conversion mechanism; and
   an output shaft rotatably journaled to the housing,
      wherein each of the first and second crank arms has a length greater than eight inches,
      wherein the first gear engages the third gear so that the first and second crank arms pivot in opposite directions,
      wherein the conversion mechanism is trained with the second and fourth gears for converting the reciprocating pivoting movements of the second and fourth gears driven by the first and second crank arms into a unidirectional rotation,
      wherein the output shaft is trained with the conversion mechanism and is adapted to be trained to a power transmission of the human powered vehicle, and
      wherein the first and second shafts are offset one above the other.

44. A propelling mechanism according to claim 43, wherein the gearbox housing is configured to be mounted to a bicycle frame having a bottom bracket, so that the entire gearbox housing is located in front of the bottom bracket.

45. A propelling mechanism according to claim 43, wherein the effective length of the crank arm is adjustable.

46. A propelling mechanism according to claim 44, wherein the first and second crank arms are configured to extend rearwardly from the respective first and second shafts when the gearbox housing is mounted to the human powered vehicle, with the first and second crank arms reciprocating in the opposite directions through an arc that passes behind the bottom bracket.

47. A propelling mechanism according to claim 43, wherein the gearbox housing further includes an anti-theft ring for attaching an anti-theft device.

48. A propelling mechanism according to claim 44, wherein the gearbox housing is configured to be mounted to the down tube with at least two U-bolts.

49. A propelling mechanism securable to a human powered vehicle, comprising:
   a gearbox housing;
   first and second shafts each rotatably journaled to the housing;
   first and second crank arms, wherein the first crank arm is secured to the first shaft from one side of the housing and the second crank arm is secured to the second shaft from the opposite side of the housing;
   a gear train including first and second gears mounted on the first shaft, third and fourth gears mounted on the second shaft;
   a conversion mechanism; and
   an output shaft rotatably journaled to the housing,
      wherein the first gear engages the third gear so that the first and second crank arms pivot in opposite directions,
      wherein the conversion mechanism is trained with the second and fourth gears for converting the reciprocating pivoting movements of the second and fourth gears driven by the first and second crank arms into a unidirectional rotation,
      wherein the output shaft is trained with the conversion mechanism and is adapted to be trained to a power transmission of the human powered vehicle, and
      wherein the conversion mechanism includes a third shaft journaled for rotation to the gearbox housing, first and second free-wheeled gears mounted on the third shaft, wherein the first and second free-wheeled gears engage the second and fourth gears respectively and are configured to rotate the third shaft in one direction, but rotate in the opposite direction without rotating the third shaft.

50. A propelling mechanism according to claim 49, wherein the conversion mechanism further includes a fifth gear mounted on the third shaft, a fourth shaft rotatably journaled to the housing, sixth and seventh gears mounted on the fourth shaft, and an eighth gear mounted to the output shaft, wherein the fifth gear engages the sixth gear to drive the fourth shaft and the seventh gear engages the eighth gear to drive the output shaft.

51. A propelling mechanism according to claim 39, wherein the conversion mechanism further includes a fifth gear mounted on the third shaft, a fourth shaft rotatably journaled to the housing, an intermediary gear mounted on the fourth shaft, and an output gear mounted to the output shaft, wherein the fifth gear engages the intermediary gear to drive the fourth shaft and the output gear engages the intermediary gear to drive the output shaft.

52. A propelling mechanism according to claim 50, wherein the first and second gears are integrally united together and the third and fourth gears are united together, and wherein the first and third gears are positioned between the second and fourth gears.

53. A propelling mechanism according to claim 51, wherein one of the fifth, intermediary, and output gears is free-wheeled so that the output shaft does not back drive either the third or fourth shaft when the output shaft is rotated in reverse to the propelling direction.

54. A propelling mechanism securable to a human powered vehicle, comprising:

a gearbox housing;

first and second shafts each rotatably journaled to the housing;

first and second crank arms, wherein the first crank arm is secured to the first shaft from one side of the housing and the second crank arm is secured to the second shaft from the opposite side of the housing;

a gear train including first and second gears mounted on the first shaft, third and fourth gears mounted on the second shaft;

a conversion mechanism; and an output shaft rotatably journaled to the housing, wherein the first gear engages the third gear so that the first and second crank arms pivot in opposite directions, wherein the conversion mechanism is trained with the second and fourth gears for converting the reciprocating pivoting movements of the second and fourth gears driven by the first and second crank arms into a unidirectional rotation, wherein the output shaft is trained with the conversion mechanism and is adapted to be trained to a power transmission of the human powered vehicle, and further including means for mounting at least one of the first and second crank arms offset from the respective shaft.

55. A propelling mechanism securable to a human powered vehicle, comprising:

a gearbox housing;

first and second shafts each rotatably journaled to the housing;

first and second crank arms, wherein the first crank arm is secured to the first shaft from one side of the housing and the second crank arm is secured to the second shaft from the opposite side of the housing;

a gear train including first and second gears mounted on the first shaft, third and fourth gears mounted on the second shaft;

a conversion mechanism; and an output shaft rotatably journaled to the housing, wherein the first gear engages the third gear so that the first and second crank arms pivot in opposite directions, wherein the conversion mechanism is trained with the second and fourth gears for converting the reciprocating pivoting movements of the second and fourth gears driven by the first and second crank arms into a unidirectional rotation, wherein the output shaft is trained with the conversion mechanism and is adapted to be trained to a power transmission of the human powered vehicle, and further including an angular adjustment mechanism for angularly adjusting at least one of the first and second crank arms relative to the respective first or second shaft.

56. A propelling mechanism according to claim 55, wherein the angular adjustment mechanism comprises at least one disk secured to one of the first and second shafts.

57. A propelling mechanism according to claim 55, wherein the angular adjustment mechanism comprises first and second disks secured respectively to the first and second shafts, and wherein the first and second crank arms are adjustably secured respectively to the first and second disks.

58. A propelling mechanism according to claim 56, wherein the one disk has a plurality of positioning holes, one of the first and second crank arms being mounted to the one disk through at least a pair of positioning holes.

59. A propelling mechanism according to claim 58, wherein the one disk has inner and outer concentric circular arrays of positioning holes.

60. A propelling mechanism according to claim 59, wherein the one crank arm mounted to the one disk has two pairs of holes, one pair for mounting to the inner circular array of positioning holes and the other pair for mounting to the outer circular array of positioning holes.

61. A propelling mechanism according to claim 60, wherein the one crank arm has a third pair of holes, wherein the one crank arm is mountable to the one disk offset from the respective shaft.

62. A propelling mechanism according to claim 59, wherein the number of positioning holes in the one disk is one of 36 or 40.

63. A propelling mechanism according to claim 62, where each circular array of positioning holes has 18 position holes, and wherein the 18 positioning holes of each circular array are equally spaced, and the positioning holes of the inner circular array being circumferentially staggered relative to the positioning holes of the outer circular array.

64. A propelling mechanism according to claim 62, where each circular array of positioning holes has 20 position holes, and wherein the 20 positioning holes of each circular array are equally spaced, and the positioning holes of the inner circular array being circumferentially staggered relative to the positioning holes of the outer circular array.

65. A propelling mechanism according to claim 63, wherein the positioning holes of each of the inner and outer circular arrays are spaced at 20° intervals, and wherein the spacing between adjacent holes of the staggered positioning holes are spaced at 10° intervals.

66. A propelling mechanism according to claim 64, wherein the positioning holes of each of the inner and outer circular arrays are spaced at 18° intervals, and wherein the spacing between adjacent holes of the staggered positioning holes are spaced at 9° intervals.

67. A propelling mechanism according to claim 56, wherein the one disk has a hexagonal hole, and the respective first or second shaft has a hexagonal end that mates with the hexagonal hole, the hexagonal hole allowing a quick 60° shift interval of the respective disk relative to the shaft.

68. A propelling mechanism according to claim 55, wherein an effective length of each crank arm is between 8–14 inches.

69. A propelling mechanism according to claim 55, wherein an effective length of each crank arm is 14 inches.

* * * * *